United States Patent
Kalyanasundaram (10) Patent No.: US 10,309,840 B2
(45) Date of Patent: Jun. 4, 2019

(54) DETERMINING AMBIENT TEMPERATURE USING TRANSIENT DEVICE CHARACTERISTICS

(71) Applicant: Apple Inc., Cupertino, CA (US)

(72) Inventor: Nagarajan Kalyanasundaram, Bangalore (IN)

(73) Assignee: APPLE INC., Cupertino, CA (US)

( * ) Notice: Subject to any disclaimer, the term of this patent is extended or adjusted under 35 U.S.C. 154(b) by 625 days.

(21) Appl. No.: 14/950,454

(22) Filed: Nov. 24, 2015

(65) Prior Publication Data

US 2016/0146678 A1    May 26, 2016

Related U.S. Application Data

(60) Provisional application No. 62/084,113, filed on Nov. 25, 2014.

(51) Int. Cl.
| | |
|---|---|
| *G01K 7/22* | (2006.01) |
| *G01K 13/00* | (2006.01) |
| *G01K 13/02* | (2006.01) |
| *G01K 7/42* | (2006.01) |

(52) U.S. Cl.
CPC ............... *G01K 7/22* (2013.01); *G01K 7/42* (2013.01); *G01K 13/00* (2013.01); *G01K 13/02* (2013.01)

(58) Field of Classification Search
CPC ...... G01K 13/00; G01K 7/427; G01K 15/005; G01K 1/20; G01K 13/02
USPC ..... 374/170, 183, 185, 4, 5, 152, 1, 109, 29
See application file for complete search history.

(56) References Cited

U.S. PATENT DOCUMENTS

| | | | | |
|---|---|---|---|---|
| 5,623,594 A | * | 4/1997 | Swamy | G01K 1/14 374/E1.018 |
| 6,741,470 B2 | * | 5/2004 | Isenburg | H01L 23/4093 165/80.3 |
| 7,622,896 B2 | * | 11/2009 | Nakagawa | H02J 7/047 320/150 |
| 8,954,288 B2 | * | 2/2015 | Aljabari | G01K 1/20 374/110 |
| 9,304,520 B2 | * | 4/2016 | Cheng | G05D 23/1919 |
| 9,438,071 B1 | * | 9/2016 | Helberg | H02J 50/10 |
| 2008/0234004 A1 | * | 9/2008 | Loque | H04L 29/12188 455/564 |

(Continued)

FOREIGN PATENT DOCUMENTS

| | | | | |
|---|---|---|---|---|
| CN | 103873636 A | * | 6/2014 | H02J 7/0068 |
| WO | WO 2013185679 A1 | * | 12/2013 | H02J 7/0068 |

*Primary Examiner* — Gail Kaplan Verbitsky
(74) *Attorney, Agent, or Firm* — Brownstein Hyatt Farber Schreck, LLP (57) ABSTRACT

Embodiments described herein are directed to determining an ambient temperature of an environment in which a device is operating. In some embodiments, the ambient temperature of the environment is determined by determining an initial temperature of the device and also determining when the temperature of the device reaches a first temperature threshold. When the temperature of the device reaches the first temperature threshold, the device is allowed to cool for a predetermined amount of time. Upon expiration of the amount of time, a change in temperature of the device over the amount of time is detected. The detected change in temperature is then used to determine an ambient temperature of the environment in which the device is operating.

26 Claims, 6 Drawing Sheets

(56) References Cited

U.S. PATENT DOCUMENTS

| | | | | |
|---|---|---|---|---|
| 2011/0119018 A1* | 5/2011 | Skarp | ............... | G01K 7/42 |
| | | | | 702/130 |
| 2013/0107905 A1* | 5/2013 | Campbell | ........... | G01F 25/0007 |
| | | | | 374/1 |
| 2013/0314054 A1* | 11/2013 | Bergqvist | ............. | H01M 10/44 |
| | | | | 320/162 |
| 2014/0163765 A1* | 6/2014 | Jain | ............... | G06F 1/206 |
| | | | | 700/300 |
| 2014/0355649 A1* | 12/2014 | Niederberger | ....... | G01D 3/0365 |
| | | | | 374/152 |
| 2014/0362889 A1* | 12/2014 | Jang | ............... | G01K 13/00 |
| | | | | 374/152 |
| 2015/0001965 A1* | 1/2015 | Angeli | ............... | G01R 19/00 |
| | | | | 307/117 |
| 2015/0241370 A1* | 8/2015 | Mueller | ............... | G01K 1/20 |
| | | | | 345/173 |
| 2016/0014554 A1* | 1/2016 | Sen | ............... | H04W 4/029 |
| | | | | 455/456.2 |
| 2016/0131541 A1* | 5/2016 | Kim | ............... | H04N 5/23241 |
| | | | | 374/152 |
| 2017/0074582 A1* | 3/2017 | Rusnack | ............... | G01K 1/02 |
| 2017/0288452 A1* | 10/2017 | Adams | ............... | H02J 7/355 |

* cited by examiner

DETERMINING AMBIENT TEMPERATURE USING TRANSIENT DEVICE CHARACTERISTICS

CROSS-REFERENCE TO RELATED APPLICATION

This application is a nonprovisional patent application of and claims the benefit of U.S. Provisional Patent Application No. 62/084,113 filed Nov. 25, 2014 and titled "Determining Ambient Temperature Using Transient Device Characteristics," the disclosure of which is hereby incorporated herein by reference in its entirety.

FIELD

The embodiments disclosed herein are directed to determining an ambient temperature of an environment in which a device is operating. More specifically, the present disclosure is directed to determining the temperature of the environment in which the device is operating using transient characteristics of the device.

BACKGROUND

Conventional electronic devices use various forms of power in order to operate. In some instances, the consumption of power and/or providing power to the electronic device may cause the temperature of the electronic device to increase. The increase in temperature of the electronic device may cause a user of the electronic device to become concerned or may cause the user of the electronic device to avoid handling the electronic device due to perceived discomfort in holding or otherwise using the electronic device.

SUMMARY

The various embodiments described herein are directed to controlling the temperature of a device. In some embodiments, the initial temperature of the device is determined. Once the initial temperature is determined, a temperature stimulus is applied to the device until the device reaches a first temperature threshold. Once the first temperature threshold is reached, the device is allowed to cool for a predetermined amount of time. A change in temperature of the device is then determined upon expiration of the predetermined amount of time. From this information, the ambient temperature of an environment in which the device is operating may be determined and a peak temperature of the device is adjusted based, at least in part, on the ambient temperature of the environment.

Embodiments described herein also provide an alternate method for controlling the temperature of a device. According to this method, an initial temperature of the device is determined and a temperature stimulus is applied to the device. A determination is made as to when a temperature of the device reaches a first temperature threshold as a result of the applied temperature stimulus. When the temperature of the device reaches the first temperature threshold, the device is allowed to cool for a predetermined amount of time. A determination is then made as to the amount of time it took to cool the device from the first temperature threshold to a second temperature threshold. Using this information, the ambient temperature of an environment in which the device is operating may be determined. The peak temperature of the device is then adjusted based, at least in part, on the ambient temperature of the environment.

Also disclosed is a device having, among other components, a processing unit, a thermistor, and a memory. Each of these components may be used to determine and/or control the temperature of the device. In some embodiments, the thermistor may be used to determine the initial temperature of the device. Once the initial temperature is determined, a temperature stimulus is applied to the device until the device reaches a first temperature threshold. Once the first temperature threshold is reached, the device is allowed to cool for a predetermined amount of time. The thermistor may then determine a change in temperature of the device upon expiration of the predetermined amount of time. From this information, the ambient temperature of an environment in which the device is operating may be determined and a peak temperature of the device is adjusted based, at least in part, on the ambient temperature of the environment.

In some embodiments, the ambient temperature of an environment in which a device is operating may also be determined. In such embodiments, the ambient temperature of the environment is determined by determining an initial temperature of the device and determining when the temperature of the device reaches a first temperature threshold. When the temperature of the device reaches the first temperature threshold, the device is allowed to cool for a predetermined amount of time. Upon expiration of the predetermined amount of time, a change in temperature of the device over the predetermined amount of time is detected. The detected change in temperature is then used to determine an ambient temperature of the environment in which the device is operating.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The embodiments described herein are directed to controlling the temperature of a device. The embodiments described may also be used to determine an ambient temperature of an environment in which a device operates, determine a cool down time of a device, determine a time at which a device will reach a certain temperature and so on. In some embodiments, the monitored temperature of the device may be an operating temperature of the device, the temperature of one or more components of the device, the surface temperature of the device and so on.

More specifically, the embodiments described herein disclose using transient characteristics of a device to determine an ambient temperature of the environment in which the device is operating and may also be used to control the temperature of the device. Based on the determined ambient temperature in the environment, a peak temperature or an allowable temperature of the device may be determined. Such information may be useful in a variety of circumstances such as, but not limited to, enabling the device to reach an allowable surface temperature during a battery charging operation or other operating modes.

These and other embodiments are discussed below with reference to FIGS. 1A-5. However, those skilled in the art will readily appreciate that the detailed description given herein with respect to these Figures is for explanatory purposes only and should not be construed as limiting.

Figure 1A:
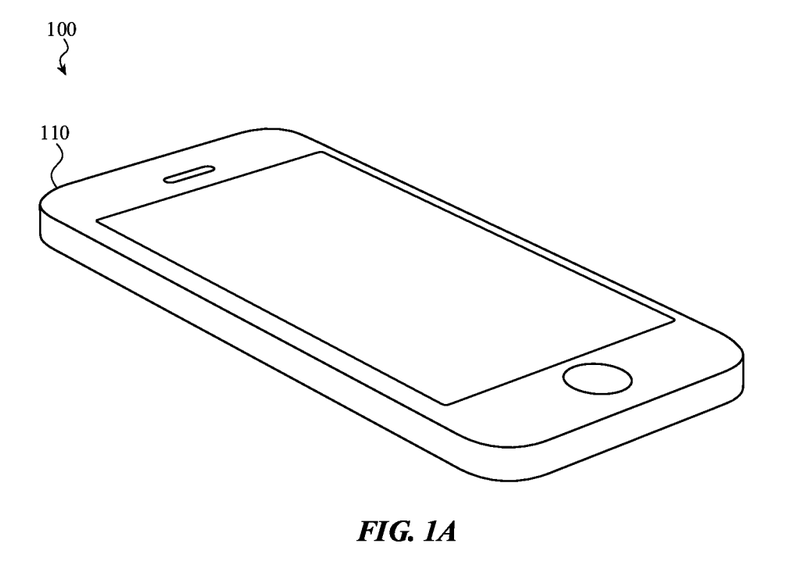
FIG. 1A illustrates an example electronic device that may be used with one or more embodiments of the present disclosure.
Figure 1B:
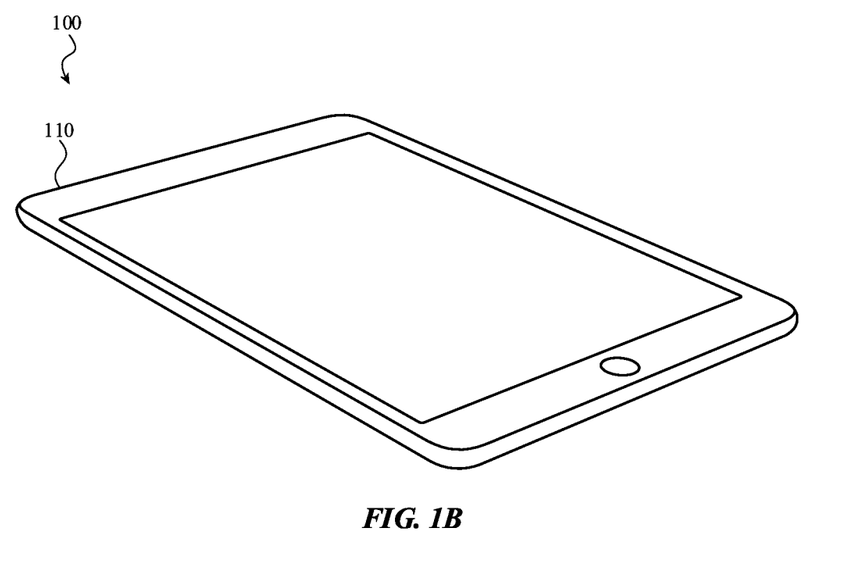
FIG. 1B illustrates another example electronic device that may be used with one or more embodiments of the present disclosure.
Figure 1C:
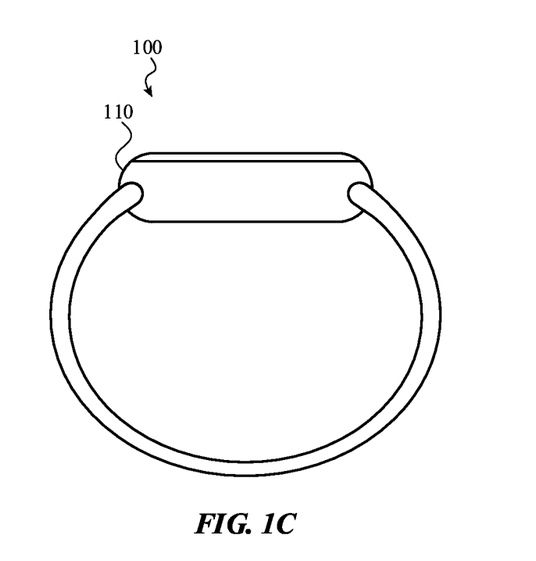
FIG. 1C illustrates a third example electronic device that may be used with one or more embodiments of the present disclosure.

FIGS. 1A-1C illustrate example electronic devices 100 that may be used with one or more embodiments of the present disclosure. Further, each of the electronic devices may include the various components described below with respect to FIG. 5. In some embodiments, the electronic device 100 may be a mobile telephone (FIG. 1A), a tablet computer (FIG. 1B), a wearable electronic device (FIG. 1C), a personal digital assistant, a portable music player, and so on.

Although specific electronic devices are shown and described, the embodiments disclosed herein are not limited to such devices. Indeed, the various embodiments disclosed herein may be used in a variety of devices including laptop computers, desktop computers and so on. The embodiments described herein may also be used with a variety of other devices including but not limited to ovens, engines, irons, or any other device that heats and/or cools due to various operating conditions or applied temperature stimuli.

As shown in FIGS. 1A-1C, each electronic device may include a housing 110. The housing 110 may be made from a variety of materials including stainless steel, aluminum, plastic, gold, glass, platinum, or other such materials and combinations thereof. In some embodiments, the temperature of the housing 110 may increase or decrease based on one or more operating conditions of the electronic device 100.

For instance, if the electronic device 100 is being charged, the charging operation may cause the temperature of the housing 110 to increase. As the temperature of the housing 110 increases, it may become physically uncomfortable to hold. In a more specific example, the electronic device 100 may be capable of being inductively or wirelessly charged. Thus, as the electronic device 100 is placed on or otherwise coupled to an inductive charging apparatus, the electromagnetic field that is used to transfer energy between the charging apparatus and the electronic device 100 may cause the surface temperature of the housing 110 to increase. Thus, it may be desirable to know both the temperature of the electronic device 100 and the ambient temperature surrounding the electronic device 100 as a higher electronic device temperature may be more tolerable at a higher ambient temperature. Although inductive charging is specifically mentioned, the embodiments described herein may be used when the electronic device 100 is being charged using other charging methods such as, for example, contact charging.

In another example, the temperature of the electronic device 100 (or one or more components of the electronic device 100) may include a battery that consumes power. As the battery of the electronic device 100 consumes power, the temperature of the battery and/or the electronic device 100 may increase. Using the embodiments described herein, a determination may be made as to a peak temperature that the battery, the electronic device 100, and/or the housing 110 is allowed to reach based on the various environments or environmental conditions the electronic device 100 is operating in.

For example, if the electronic device is a wearable electronic device such as shown in FIG. 1C, the wearable electronic device may be permitted to reach a first temperature when operating in a first environment (e.g., worn on a wrist of a user) or first operating condition and be permitted to reach a second temperature when operating in a second environment (e.g., charging or otherwise not on the wrist the user) or otherwise operating in a second operating condition. In another example, the if the electronic device 100 is a mobile phone such as shown in FIG. 1A, the mobile phone may be permitted to reach a first temperature in one operating environment (e.g., in a pocket of a user) and be permitted to reach a second temperature when operating in a second environment (e.g., charging, lying on a table, carried in a hand of the user and so on). As will be described below, the allowable temperature is based, at least in part, on the environment, and more specifically the ambient temperature of the environment the device is operating in.

Although specific example environments are mentioned, the embodiments disclosed herein may be used to determine the ambient temperature of any operating environment. These environments include but are not limited to: enclosed areas such as purses, pockets, bags, and so on; open areas such as in a room, outside, on a desk, on a bed, on a table and so on; and whether the device is being worn and/or used by a user. Further the various embodiments described herein may be used in various operating states or operational parameters of the electronic device 100 including, but not limited to: charging operations, standby modes, active modes and so on.

Figure 2:
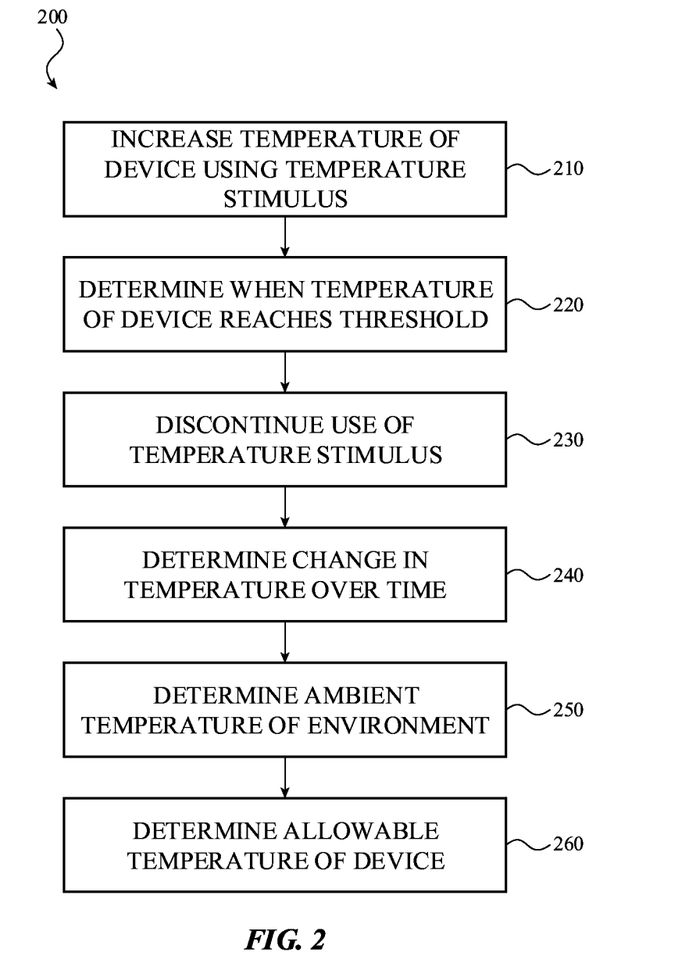
FIG. 2 illustrates a method for determining the ambient temperature of an environment in which the electronic device is operating.

FIG. 2 illustrates a method 200 for determining the ambient temperature of an environment in which a device is operating according to one or more embodiments of the present disclosure. In some embodiments, the method 200 may be used by the various electronic devices 100 described above with respect to FIGS. 1A-1C. In addition, the method 200 may be used by the various other devices described herein. In addition to determining the ambient temperature of the environment such as described above, the method 200 may be used to control the charging operations of the device and/or may be used to control a temperature of the device.

For example, the one or more electronic devices described herein may dissipate power. As the power dissipates, the surface temperature of the device may increase. Due to the increased temperature, the device may have a higher temperature than the ambient temperature of the environment in which the device is operating. In addition, the rate of power removal may be dependent on the ambient temperature that surrounds the device. Accordingly, it may be desirable to accurately determine the ambient temperature of the environment in which the device operates so the device may have a surface temperature that is desirable with respect to the ambient temperature. More specifically, the temperature of the device may be configured to have a first peak temperature (e.g., 40 degrees Celsius) when the ambient temperature of the environment is above a first level and have a second peak temperature (e.g., 43 degrees Celsius) when the ambient temperature is above a second level that is greater than the first level.

Accordingly, the method 200 is used to determine the ambient temperature of an environment in which the device is operating by looking at the transient characteristics of the device. The method 200 may be used to determine an absolute decrease in temperature of the device or the surface of the device over a given time period. This decrease will be smaller if the ambient temperature of the environment in which the device operates is at a higher temperature and will be greater if the ambient temperature of the environment in which the device operates is at a lower temperature.

In some embodiments, the temperature of the device may be related to or be caused by a charging operation. For example, in an inductive charging operation, the induction may cause the temperature of the device to increase. However, depending on the determined ambient temperature of the environment, the device may be permitted to reach a first temperature in a relatively hot environment and conversely be permitted to reach a second, lower temperature, in a relatively cooler environment.

As such, the electronic device 100 may be charged for a first duration of time until the temperature of the device reaches the first peak temperature or may be charged for a second duration of time until the temperature of the device reaches the second peak temperature. Although this specific example has been given, the embodiments described herein may have a variety of different uses.

Accordingly, method 200 begins at operation 210 in which the temperature of the device is increased using a temperature stimulus. In some embodiments, the temperature stimulus may be a charging operation that charges a battery and/or provides power to various components of the device. For example, in some embodiments, the device may be charged using a wireless or inductive charging system. As discussed above, the wireless charging system may cause the temperature of a housing of the device to increase. In other embodiments, the device may be charged using a cable, a cord, a plug or other such connector which may also cause the temperature of the device to increase. Although charging is specifically mentioned, other temperature stimuli are contemplated.

Flow then proceeds to operation 220 and a determination is made as to when the temperature of the device reaches a first temperature threshold. In some embodiments, this determination may be made by a thermistor or other sensor within or otherwise associated with the device. The first temperature threshold may be a predetermined temperature. In some embodiments, the first temperature threshold is 25 degrees Celsius although other temperatures may be used.

Once the temperature of the device reaches the first temperature threshold, operation 230 provides that the temperature stimulus is removed or is otherwise no longer applied to the device. Continuing with the charging example above, once the first temperature threshold is reached, the current from the wireless charging system is no longer applied to the device. In some embodiments, when the sensor or thermistor determines that the first temperature threshold has been reached, the device may signal the wireless charging system to cease any charging operations.

Flow then proceeds to operation 240 and the change in temperature of the device is monitored. In some embodiments, the change in temperature is monitored over a predetermined amount of time. For example, once the temperature stimulus is removed, the thermistor or other sensor of the device may determine the change in temperature of the device over one minute. In another embodiment, the thermistor may determine an amount of time it takes the device to cool a predetermined number of degrees (e.g., one degree, five degrees etc.).

Using this information, flow proceeds to operation 250 and the ambient temperature of the environment is determined. For example and as discussed above, if the ambient temperature of the environment is relatively hot, the change in temperature over the predetermined amount of time may be small when compared to the change in temperature that would occur in relatively cool environments. In embodiments where the time is monitored to determine how long it takes to reach the desired change in temperature, the amount of time to reach the desired change in temperature may be large in hotter environments and relatively small in cooler environments.

In certain embodiments, operation 250 may also take into account the material the device made from as well as convection, radiation and other material properties of the device.

Once the ambient temperature of the environment is determined, flow proceeds to operation 260 and a peak temperature of the device is determined. In some embodiments and as discussed above, the peak temperature of the device may be higher in hotter environments and lower in cooler environments. As such, one or more operations of the device may also be adjusted accordingly.

Continuing with the charging example from above, if it is determined that the device is operating in a relatively hot environment, the device may be charged for a longer period of time as the allowed peak temperature of the device may be higher when compared to the peak temperature of a device in cooler environments. Likewise, if the device is operating in a relatively cooler environment, the device may be charged for shorter durations as the allowable peak temperature may be lower.

In some cases, the embodiments described above may be used at predetermined times and/or during predetermined operating conditions. In other embodiments, a temperature curve associated with the device (e.g., the temperature graph 300 of FIG. 3) may be analyzed to determine various points in time that the device is operating at higher temperatures and at lower temperatures. Using this information, the device may opt to perform various operations when the overall temperature of the device is lower.

For example, if an electronic device is charged during a set time period (e.g., at night) the embodiments described herein may be used to determine an optimal charging time. As such, the device may implement a charging operation at cooler times of the day. In another embodiment, the electronic device 100 may be used to obtain environment information from secondary sources and adjust the charging algorithm accordingly. For example, the device may determine from a secondary source that on a given day, it is going to be relatively hot. As such, the device may determine that it can perform a charging operation for longer periods of time on that day as the ambient temperature may permit a higher peak temperature of the device.

Figure 3:
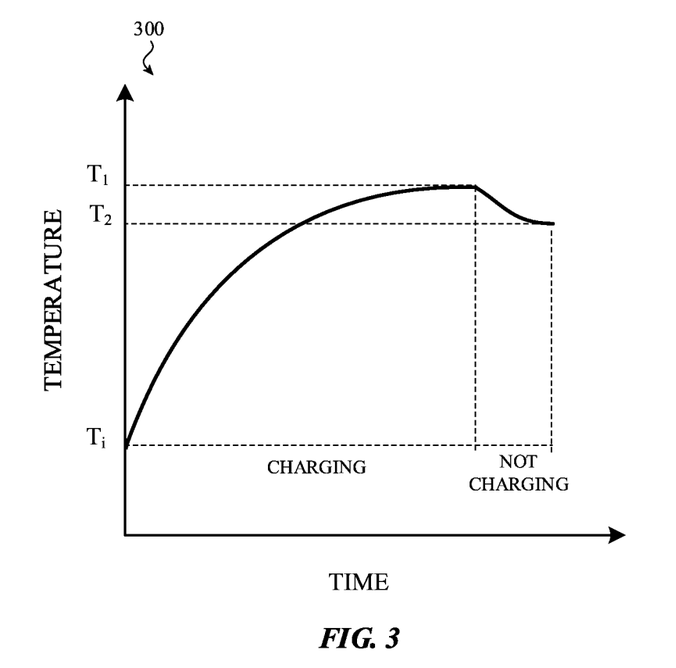
FIG. 3 illustrates an example temperature graph.

FIG. 3 illustrates an example temperature graph 300 according to one or more embodiments of the present disclosure. In some embodiments, the temperature graph 300 may be used in conjunction with the method 200 described above. In addition, the temperature graph 300 may be associated with the various electronic devices 100 shown and described above with respect to FIGS. 1A-1C.

As shown in FIG. 3, the device has an initial temperature represented in the temperature graph 300 as $T_i$. As a temperature stimulus is applied to the device, such as, for example, as heat caused by a charging operation causes the temperature of the device to increase, the temperature of the device rises from the initial temperature to a first temperature threshold $T_1$. In some embodiments, the first temperature threshold is 35 degrees Celsius although other temperatures may be used.

Once the first temperature threshold has been reached, the temperature stimulus is no longer applied to the device. For example, the device is no longer subject to a charging operation. Once the temperature stimulus is no longer applied, the temperature of the device begins to cool to a second temperature threshold represented as $T_2$. In some embodiments, the second temperature threshold is 34 degrees Celsius although other temperatures may be used.

In some embodiments, the change in temperature from $T_1$ to $T_2$ is measured over a predetermined amount of time. For example, if the predetermined amount of time is one minute, the amount of the change in temperature is monitored over that time period. Upon expiration of the predetermined time period, the change in temperature, or the rate of change in the temperature, of the device is used to determine the ambient temperature of the environment in which the device operates.

In another embodiment, when the first temperature threshold is reached, the temperature of the device is monitored to determine how long it takes to reach the second temperature threshold. For example, the time it takes for the device to cool from 35 degrees Celsius to 34 degrees Celsius is monitored. As discussed above, the longer the time period, the warmer the ambient temperature of the environment. Likewise, the shorter the time period, the cooler the ambient temperature of the environment. Based on the monitored time period, the ambient temperature of the environment in which the device operates may be determined.

In some embodiments, the ambient temperature T of the environment may be found by the following formula at any given time period t: $T(t)=T_a+(T_i-T_a)e^{-kt}$. In this formula $T_a$ is the ambient temperature, $T_i$ is the initial temperature of the device and k is a constant that is dependent on convection, radiation and material properties of the device. As discussed above, by letting the device cool down by a known duration of time or to a known temperature, the above equation may be used to determine the ambient temperature of the environment the device is operating in. In some embodiments, the decrease in temperature may follow one or more temperature curves such as the example temperature curves shown in FIG. 4 and as will be described below.

Once the ambient temperature of the environment is determined, the device may be calibrated and allowed to reach various peak temperatures. For example, if the ambient temperature is determined to be at or above a first temperature level, the peak temperature of the device may have a first value. However, if the ambient temperature is determined to be below the first temperature level or at a second temperature level, the peak temperature of the device may have a second value.

Figure 4:
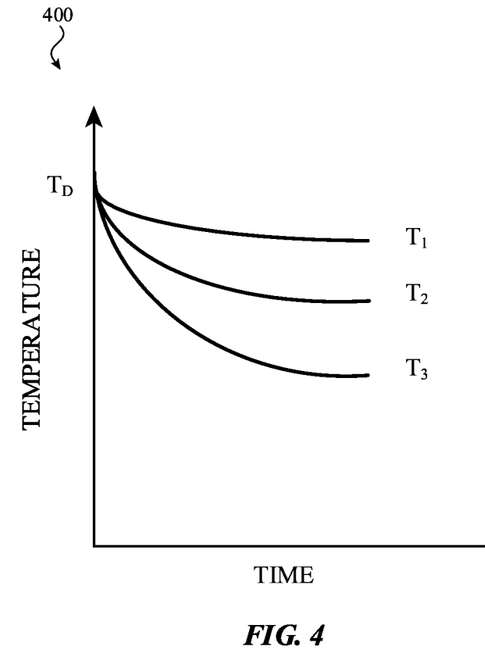
FIG. 4 illustrates an example temperature graph that shows various ambient temperature curves.

FIG. 4 illustrates an example temperature graph 400 that shows various ambient temperature curves according to one or more embodiments of the present disclosure. As discussed above, the temperature of a device may increase due to various factors or operating conditions. In a more specific example, the temperature of a device may increase as a result of a charging operation.

As also discussed above, the device may be allowed to reach different peak temperatures depending on the ambient temperature of the environment the device is operating in. For example, in environments that have a higher ambient temperature, the device may be allowed to reach a higher peak temperature.

As such, the temperature graph 400 shows different example temperature curves that represent cooling effects of different ambient temperatures. For example, the device may have a first temperature represented by $T_D$. Depending on the ambient temperature in the environment, the temperature of the device may follow temperature curve $T_1$, temperature curve $T_2$, or temperature curve $T_3$. More specifically, in environments with a higher ambient temperature, the temperature of the device may follow temperature curve $T_1$ as it cools. In environments that have a cooler ambient temperature, the temperature of the device may follow temperature curve $T_2$ as it cools and so on.

Figure 5:
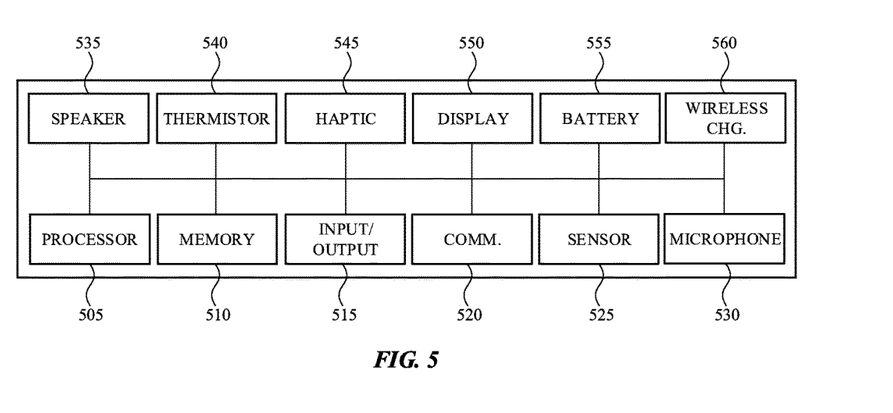
FIG. 5 is a block diagram illustrating example components of an electronic device.

FIG. 5 illustrates example components of a device 500 according to one or more embodiments of the present disclosure. In some embodiments, the device 500 may correspond to the electronic device 100 shown and described above with respect to FIGS. 1A-1C.

As shown in FIG. 5, the device 500 includes one or more processors 505 that may be configured to access a memory 510. The memory may have instructions or computer programs configured to execute the various embodiments described herein. For example, the instructions or computer programs may be configured to perform one or more of the operations or functions described above with respect to FIG. 2. In some embodiments, the instructions stored by the memory 510 may be configured to control or coordinate the operation of the device 500, a display 550 of the device 500, one or more input/output components 515 of the device 500, one or more communication channels 520 of the device 500, one or more sensors 525, a speaker 535, a microphone 530, and/or one or more haptic output devices 545.

The one or more processors 505 may be implemented as any device capable of processing, receiving, or transmitting data or instructions. For example, the one or more processors 505 may include one or more of a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 510 may be used to store electronic data that is used by the device 500. For example, the memory 510 can store electronic data or content such as, for example, audio and video files, documents and applications, device settings and user preferences, timing and control signals or data for the various modules, data structures or databases and so on. The memory 510 can be configured as any type of memory including but not limited to random access memory, read-only memory, Flash memory, removable memory, or other types of storage elements, or combinations of such devices.

Although the input/output components 515 are represented as a single item, the input/output components 515 may represent a number of different input and output components including buttons, switches, and dials for accepting user input as well as microphones, lights, displays, speakers and the like. Generally, the input/output components 515 are configured to translate a user-provided input into a signal or instructions that may be accessed using instructions executed by the one or more processors 505.

The device 500 may also include various acoustic elements, including a microphone 530 and a speaker 535. The microphone 530 and the speaker 535 may include drive electronics or circuitry and may be configured to receive and produce an audible sound or acoustic signal.

The one or more communication channels 520 may include one or more wireless interfaces that are adapted provide communications between the one or more processors 505 and an external device. For example, in some embodiments, the communication channels 520 may be used to receive weather information, time information and other data from various external sources. The one or more communication channels 520 may also be used to transmit and receive data and/or other signals to and from various external devices. In some cases, the external device may be part of an external communication network that is configured to exchange data with the device 500.

Generally, the wireless interface may include, without limitation, radio frequency, optical, acoustic, and/or magnetic signals and may be configured to operate over a wireless interface or protocol. Example wireless interfaces include radio frequency cellular interfaces, fiber optic interfaces, acoustic interfaces, Bluetooth interfaces, infrared interfaces, USB interfaces, Wi-Fi interfaces, TCP/IP interfaces, network communications interfaces or any conventional communication interfaces.

In some implementations, the one or more communication channels 520 may include a dedicated wireless communication channel between the device 500 and another user device, such as a mobile phone, tablet, computer or the like. As such, the devices may be configured to communication information to one another such as, for example, information about the ambient temperature in the environment each device is operating in. In other examples, the devices may exchange audible alerts and/or visual warnings and other content.

The device 500 may also include various sensors 525 including an ambient light sensor (ALS), proximity sensor, temperature sensor, barometric pressure sensor, moisture sensor, and so on. Thus, the sensors 525 may be used to compute an ambient temperature, air pressure, and/or water ingress into the device. In some embodiments, the sensors 525 may include one or more motion sensors for detecting movement and acceleration of the device 500. The one or more motion sensors may include an accelerometer, a gyroscope, a tilt sensor, or other type of inertial measurement device.

In a more specific example, the device 500 may include a thermistor 540 in addition to the sensors described above. The thermistor may be placed in the device 500 at a location that is away from the various heat generating and/or power consuming components. This may enable the thermistor 540 to better determine the temperature of the housing of the device as well as the various changes in temperature that occur during the different operating states of the device 500.

As briefly discussed above, the device 500 may also include one or more haptic output devices 545. The haptic output devices 545 may include one or more of a variety of haptic technologies such as, but not necessarily limited to, rotational haptic devices, linear actuators, piezoelectric devices, vibration elements, and so on. In general, the haptic device 545 may be configured to provide punctuated and distinct feedback to a user of the device. In some embodiments, the haptic output device 545 may be controlled by the processor 505. In some embodiments, the haptic output device 545 may be controlled, at least in part, by the operation of an input/output components 515, including, for example, a button, dial, crown, the display 550, the speaker 535 and so on.

The device 500 may also include a battery 555. The battery 555 may be a rechargeable power supply that is configured to provide power to the device 500. In some embodiments, the battery 555 is a rechargeable battery that may be recharged using a wireless charging system. Accordingly, in some cases, the device 500 may include a wireless charging module 560 that may be configured to receive power from an external device or dock. The wireless charging module 560 may be configured to deliver power to components of the device 500 including the battery 555.

Embodiments of the present disclosure are described above with reference to block diagrams and operational illustrations of methods and the like. The operations described may occur out of the order as shown in any of the figures. Additionally, one or more operations may be removed or executed substantially concurrently. For example, two blocks shown in succession may be executed substantially concurrently. Additionally, the blocks may be executed in the reverse order.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method for controlling a temperature of a device, comprising:
   determining an initial temperature of the device;
   applying a temperature stimulus to the device;
   determining when the temperature of the device reaches a first temperature threshold as a result of the applied temperature stimulus;
   causing the device to cool for a predetermined amount of time by removing the temperature stimulus;
   determining a change in temperature of the device upon expiration of the predetermined amount of time;
   determining an ambient temperature of an environment in which the device is operating based, at least in part, on the change in temperature of the device; and
   adjusting a maximum allowable temperature of the device based, at least in part, on the ambient temperature of the environment.

2. The method of claim 1, wherein the temperature stimulus is a charging operation.

3. The method of claim 2, wherein the charging operation is an inductive charging operation.

4. The method of claim 2, further comprising adjusting a current supplied by the charging operation based on the determined ambient temperature of the environment.

5. The method of claim 2, further comprising enabling the device to reach the adjusted maximum allowable temperature during the charging operation.

6. The method of claim 1, further comprising determining a time period to apply the temperature stimulus based, at least in part, on the determined ambient temperature of the environment.

7. The method of claim 6, wherein the determined time period to apply the temperature stimulus is based, at least in part, on a temperature curve associated with the device.

8. A method for controlling a temperature of a device, comprising:
- determining an initial temperature of the device;
- applying a temperature stimulus to the device;
- determining when the temperature of the device reaches a first temperature threshold as a result of the temperature stimulus;
- causing the device to cool for a predetermined amount of time by removing the temperature stimulus;
- determining an amount of time to cool the device from the first temperature threshold to a second temperature threshold;
- determining an ambient temperature of an environment in which the device is operating based, at least in part, on a change in temperature of the device; and
- adjusting a maximum allowable temperature of the device based, at least in part, on the ambient temperature of the environment.

9. The method of claim 8, wherein the temperature stimulus is a charging operation.

10. The method of claim 9, wherein the charging operation is an inductive charging operation.

11. The method of claim 9, further comprising adjusting a current supplied by the charging operation based on the determined ambient temperature of the environment.

12. The method of claim 9, further comprising enabling the device to reach the adjusted maximum allowable temperature during the charging operation.

13. The method of claim 12, further comprising determining a time period to apply the temperature stimulus based, at least in part, on the determined ambient temperature of the environment.

14. The method of claim 12, wherein the determined time period to apply the temperature stimulus is based, at least in part, on a temperature curve associated with the device.

15. A device, comprising:
- a processing unit;
- a thermistor; and
- a memory coupled to the processing unit, the memory for storing instructions which, when executed by the processing unit, performs a method for controlling a temperature of a device, the method comprising:
  - determining, using the thermistor, an initial temperature of the device;
  - causing, using the processing unit, a temperature stimulus to be applied to the device;
  - determining, using the thermistor, when the temperature of the device reaches a first temperature threshold as a result of the applied temperature stimulus;
  - causing, using the processing unit, the temperature stimulus to be removed from the device, thereby causing the device to cool for a predetermined amount of time;
  - determining, using the thermistor, a change in temperature of the device upon expiration of the predetermined amount of time;
  - determining, using the processing unit, an ambient temperature of an environment in which the device is operating based, at least in part, on the change in temperature of the device; and
  - adjusting a maximum allowable temperature of the device based, at least in part, on the ambient temperature of the environment.

16. The device of claim 15, wherein the temperature stimulus is a charging operation.

17. The device of claim 15, wherein causing the temperature stimulus to be applied to the device comprises causing a wireless charging operation to initiate.

18. The device of claim 16, further comprising instructions for adjusting, using the processing unit, a current supplied by the charging operation based on the determined ambient temperature of the environment.

19. The device of claim 15, further comprising instructions for determining, using the processing unit, a time period to apply the temperature stimulus based, at least in part, on the determined ambient temperature of the environment.

20. The device of claim 19, wherein the determined time period to apply the temperature stimulus is based, at least in part, on a temperature curve associated with the device and stored in the memory.

21. A method for determining an ambient temperature of an environment in which a device is operating, comprising:
- determining an initial temperature of the device;
- determining when a temperature of the device reaches a first temperature threshold;
- causing the device to cool for a predetermined amount of time; and
- determining a change in temperature of the device upon expiration of the predetermined amount of time, wherein the change in temperature of the device is used to determine the ambient temperature of the environment in which the device is operating.

22. The method of claim 21, further comprising charging a battery of the device upon determining the initial temperature of the device.

23. The method of claim 22, wherein causing the device to cool comprises ceasing to charge the device.

24. The method of claim 21, further comprising adjusting a maximum allowable temperature of the device based on the determined ambient temperature of the environment in which the device is operating.

25. The method of claim 24, further comprising enabling the device to reach the adjusted maximum allowable temperature during a charging operation.

26. The method of claim 25, wherein the charging operation is a wireless charging operation.

* * * * *